UNITED STATES PATENT OFFICE.

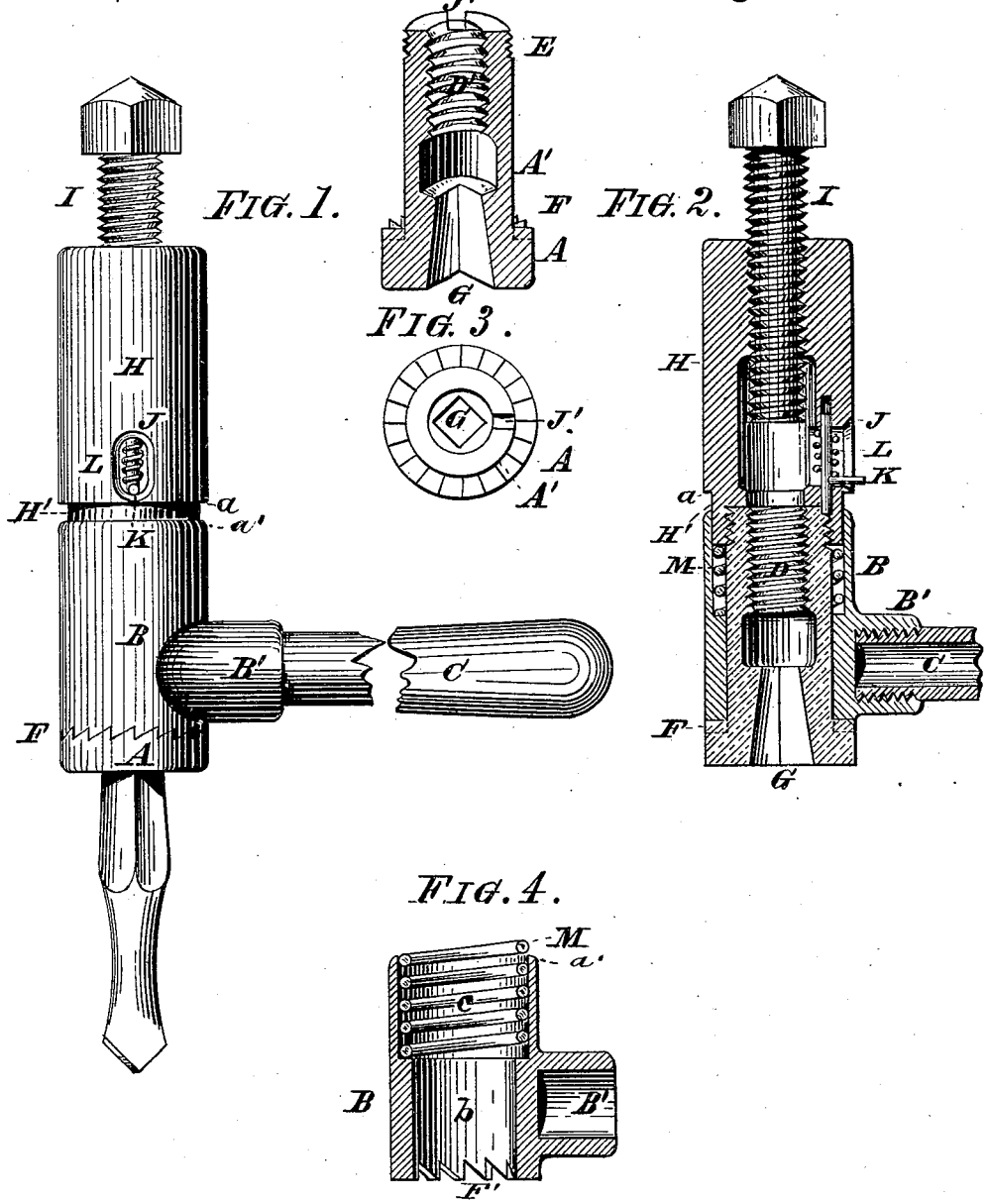

EDWARD G. FELTHOUSEN, OF BUFFALO, NEW YORK.

RATCHET-DRILL.

SPECIFICATION forming part of Letters Patent No. 246,382, dated August 30, 1881.

Application filed May 26, 1881. (No model.)

*To all whom it may concern:*

Be it known that I, EDWARD G. FELTHOUSEN, of Buffalo, in the county of Erie and State of New York, have invented certain new and useful Improvements on a Ratchet-Drill; and I do hereby declare that the following description of my said invention, taken in connection with the accompanying sheet of drawings, forms a full, clear, and exact specification, which will enable others skilled in the art to which it appertains to make and use the same.

This invention has general reference to ratchet-drills; and its object is the production of a convenient, durable, and cheap device of the class described, having a stock capable of being lengthened and shortened, substantially in the manner as and for the purpose hereinafter first fully set forth and described, and then pointed out in the claims.

In the drawings, which serve to illustrate my invention more fully, Figure 1 is an elevation of a ratchet-drill constructed in accordance with my invention. Fig. 2 is a longitudinal sectional elevation; Fig. 3, detail views of the ratchet-spindle; and Fig. 4 is a similar view of the ratchet-sleeve.

Like parts are designated by corresponding letters of reference in all the various figures.

A is the spindle of a ratchet-drill, consisting of a steel or other cylindrical piece, having a reduced portion, A', the extremity of which is externally screw-threaded at E. This spindle has a central aperture, part of which is angular, as at G, to receive the shank of the drills to be used with this device, while the remainder is screw-threaded at D.

In the upper face of the spindle A there are a series of ratchet-teeth, F, engaging with corresponding teeth in the edge of a cylindrical sleeve, B, said sleeve having a hole, *b*, fitting the reduced portion A' of the spindle A, and an enlarged portion, *c*, Fig. 4, to receive a spiral spring, M.

Upon the screw-threaded portion E of the spindle A is removably affixed a long stock, H, said stock having on its lower end a reduced portion, H', fitting the enlarged portion *c* of the sleeve B in such manner that when the sleeve B is revolved upon the spindle A by a handle, C, and thereby caused to rise by the ratchet-teeth F, and to fall by the action of the spiral spring M, the upper edge, *a'*, of said sleeve B will come in contact with shoulder *a*, and thereby prevent sleeve B from rising farther than necessary to allow it to freely revolve upon said spindle. The stock H has an internal screw-thread, D', corresponding with the screw-thread D in the spindle A, to receive an adjusting or set screw, I, of the usual construction. This screw may be inserted either into said stock, as shown, or the stock H may be removed from the spindle A and the screw I inserted into the screw-threaded aperture D, whereby the length (or rather the height) of the ratchet-drill is shortened the length of said stock H. In the stock H is an oblong aperture, J, to receive a bolt, K, (similar to an ordinary door-bolt,) having a spiral spring, L, acting in such manner as to push the bolt K downward.

In the edge of the spindle A there is a notch, J', into which the end of the bolt K may drop, and thereby prevent the stock from turning upon said spindle A.

It will now be readily observed that if the bolt K is lifted up so as to be free of the notch J' the stock H may be screwed upon or removed from the spindle A, but that as soon as said bolt engages said notch the stock H is securely locked upon said spindle.

It will be further observed that this ratchet-drill is extremely simple in construction, easily operated, and, if made of suitable metal, such as steel casting, is as strong and durable as any ratchet-drill now in the market.

Having thus fully described my invention, I claim as new and desire to secure to me by Letters Patent of the United States—

1. A ratchet-drill having a removable stock provided with an adjusting-screw locked to the spindle of said ratchet-drill, substantially as and for the object specified.

2. In ratchet-drills, the combination, with the spindle A, having the notch J', of the stock H, having the bolt K and spiral spring L, said stock being screwed upon the spindle, substantially in the manner as and for the purpose indicated.

3. In ratchet-drills having a spindle provided with an internal screw-thread to receive the usual adjusting-screw, of an auxiliary stock, H, removably affixed to said spindle, and provided with an internal screw-thread to receive said adjusting-screw, whereby the ratchet-drill is rendered capable of being lengthened and shortened, substantially in the manner as and for the object stated.

In testimony that I claim the foregoing as my invention I have hereto set my hand in the presence of two subscribing witnesses.

EDWARD G. FELTHOUSEN.

Attest:
MICHAEL J. STARK,
JOHN C. DUERR.